United States Patent
Yamanaka et al.

(10) Patent No.: US 7,699,136 B2
(45) Date of Patent: Apr. 20, 2010

(54) STEERING DEVICE FOR VEHICLE

(75) Inventors: Kosuke Yamanaka, Kashihara (JP); Shiro Nakano, Minamikawachi-gun (JP)

(73) Assignee: JTEKT Corporation, Osaka-shi (JP)

( * ) Notice: Subject to any disclaimer, the term of this patent is extended or adjusted under 35 U.S.C. 154(b) by 225 days.

(21) Appl. No.: 11/847,909

(22) Filed: Aug. 30, 2007

(65) Prior Publication Data
US 2008/0073142 A1  Mar. 27, 2008

(30) Foreign Application Priority Data
Sep. 25, 2006  (JP) .............................. 2006-258964

(51) Int. Cl.
*B62D 5/04* (2006.01)
(52) U.S. Cl. ..................................... 180/444
(58) Field of Classification Search ................. 180/444
See application file for complete search history.

(56) References Cited

U.S. PATENT DOCUMENTS

| | | | |
|---|---|---|---|
| 3,572,151 A | | 3/1971 | Morozumi et al. |
| 4,573,545 A | * | 3/1986 | Kalns ..................... 180/404 |
| 7,041,022 B2 | * | 5/2006 | Bock et al. ................. 475/7 |
| 2004/0154422 A1 | | 8/2004 | Menjak et al. |
| 2006/0073933 A1 | | 4/2006 | Vranish |
| 2007/0261909 A1 | * | 11/2007 | Higashi et al. ............. 180/446 |
| 2008/0073143 A1 | * | 3/2008 | Yamanaka ................. 180/444 |

FOREIGN PATENT DOCUMENTS

| | | |
|---|---|---|
| DE | 1 951 297 | 4/1970 |
| EP | 0 189 172 A2 | 7/1986 |
| EP | 1 686 287 A2 | 8/2006 |
| EP | 1 693 599 A1 | 8/2006 |
| JP | 2004314774 A * | 11/2004 |
| JP | 2005-344757 | 12/2005 |
| WO | WO 02/09998 A1 | 2/2002 |
| WO | WO 02103221 A1 * | 12/2002 |

\* cited by examiner

*Primary Examiner*—Lesley Morris
*Assistant Examiner*—Daniel Yeagley
(74) *Attorney, Agent, or Firm*—Oblon, Spivak, McClelland, Maier & Neustadt, L.L.P.

(57) ABSTRACT

A steering device for a vehicle includes a first sun gear connected to a steering member, a second sun gear which is operated according to operation of the steering member and connected to a steering mechanism for turning vehicle wheels, a first planet gear which is meshed with the first sun gear, and a second planet gear which is rotated integrally with the first planet gear and meshed with the second sun gear. The steering device is constructed in such a manner that at least one of the first and second sun gears is a profile shifted gear, and the first and second planet gears are formed as a cylindrical body which has internal teeth of the same number at both end parts thereof.

4 Claims, 2 Drawing Sheets

STEERING DEVICE FOR VEHICLE

BACKGROUND OF THE INVENTION

1. Field of the Invention

The present invention relates to a steering device for a vehicle which turns vehicle wheels according to operation of a steering member.

2. Related Art

A steering device for a vehicle which includes a first sun gear connected to a steering member, a second sun gear which is operated according to operation of the steering member and connected to a steering mechanism for turning vehicle wheels, a first planet gear having external teeth and meshed with the first sun gear, a second planet gear which is rotated integrally with the first planet gear and has external teeth meshed with the second sun gear, and a carrier for supporting the first and second planet gears so as to revolve and rotate on their own axes, the steering device being constructed in such a manner that at least one of the first and second sun gears is a profile shifted gear, whereby the numbers of teeth of the first and second sun gears are made different from each other, and the first and second planet gears are formed on a columnar body which has external teeth of the same number at both end parts thereof, whereby the number of components and working steps can be reduced has been known (Reference should be made to Japanese Patent Publication No. JP-A-2005-344757, for example).

However, in the steering device in JP-A-2005-344757 which is constructed in this manner, the two planet gears are arranged outside of the sun gears having the external teeth in a radial direction and at positions divided in two in a circumferential direction so as to revolve and rotate on their own axes. For this reason, an area including the planet gears becomes large-diameter in the radial direction, which makes the steering device large-sized. Moreover, lubricant to be applied to the teeth of the sun gears and the planet gears is likely to be scattered to the exterior, and sliding speed of the planet gears having the external teeth is so high that vibration noise in meshed parts becomes loud. Therefore, measures for overcoming such drawbacks have been desired.

SUMMARY OF THE INVENTION

The invention has been made in view of the above described circumstances, and it is a primary object of the invention to provide a steering device for a vehicle in which an area including planet gears can be made compact, lubricant to be applied to teeth parts of sun gears and the planet gears can be made unlikely to be scattered outward, and vibration noise in meshed parts can be reduced.

According to a first invention, there is provided a steering device for a vehicle including a first sun gear connected to a steering member, a second sun gear which is operated according to operation of the steering member and connected to a steering mechanism for turning vehicle wheels, a first planet gear which is meshed with the first sun gear, and a second planet gear which is rotated integrally with the first planet gear and meshed with the second sun gear, characterized in that at least one of the first and second sun gears is a profile shifted gear, and the first and second planet gears are formed on a cylindrical body which has internal teeth of the same number at both end parts thereof.

A steering device for a vehicle according to a second invention is characterized in that the first and second planet gears have a larger number of the teeth than that of the first and second sun gears, and rotatably arranged concentrically with the first and second sun gears, and that a carrier having a fitting hole which is eccentric with respect to the first and second sun gears is further provided, the cylindrical body being rotatably held in the fitting hole.

In the first invention, because the first and second planet gears are formed on the cylindrical body, and the first and second sun gears are disposed inside the cylindrical body, the area including the planet gears can be made smaller in size in the radial direction. Moreover, because the first and second planet gears are formed on the cylindrical body which has the internal teeth of the same number, there is no boundary between the first planet gear and the second planet gear, whereby a length in a longitudinal direction can be reduced. In this manner, reduction of size and weight can be achieved. Further, lubricant to be applied to the teeth parts of the sun gears and the planet gears is restrained by the cylindrical body from being scattered to the exterior, whereby lubricating performance can be enhanced. Still further, because the planet gears having the internal teeth revolve around the sun gears, sliding speed of the planet gears with respect to the sun gears can be made slow, whereby vibration noise in the meshed parts can be reduced.

In the second invention, the cylindrical body is rotatably held in the eccentric fitting hole of the carrier which is rotatably arranged concentrically with the first and second sun gears. Therefore, vibration of the planet gears can be reduced, and the vibration noise can be further reduced.

DETAILED DESCRIPTION OF THE PREFERRED EMBODIMENTS

Figure 1:
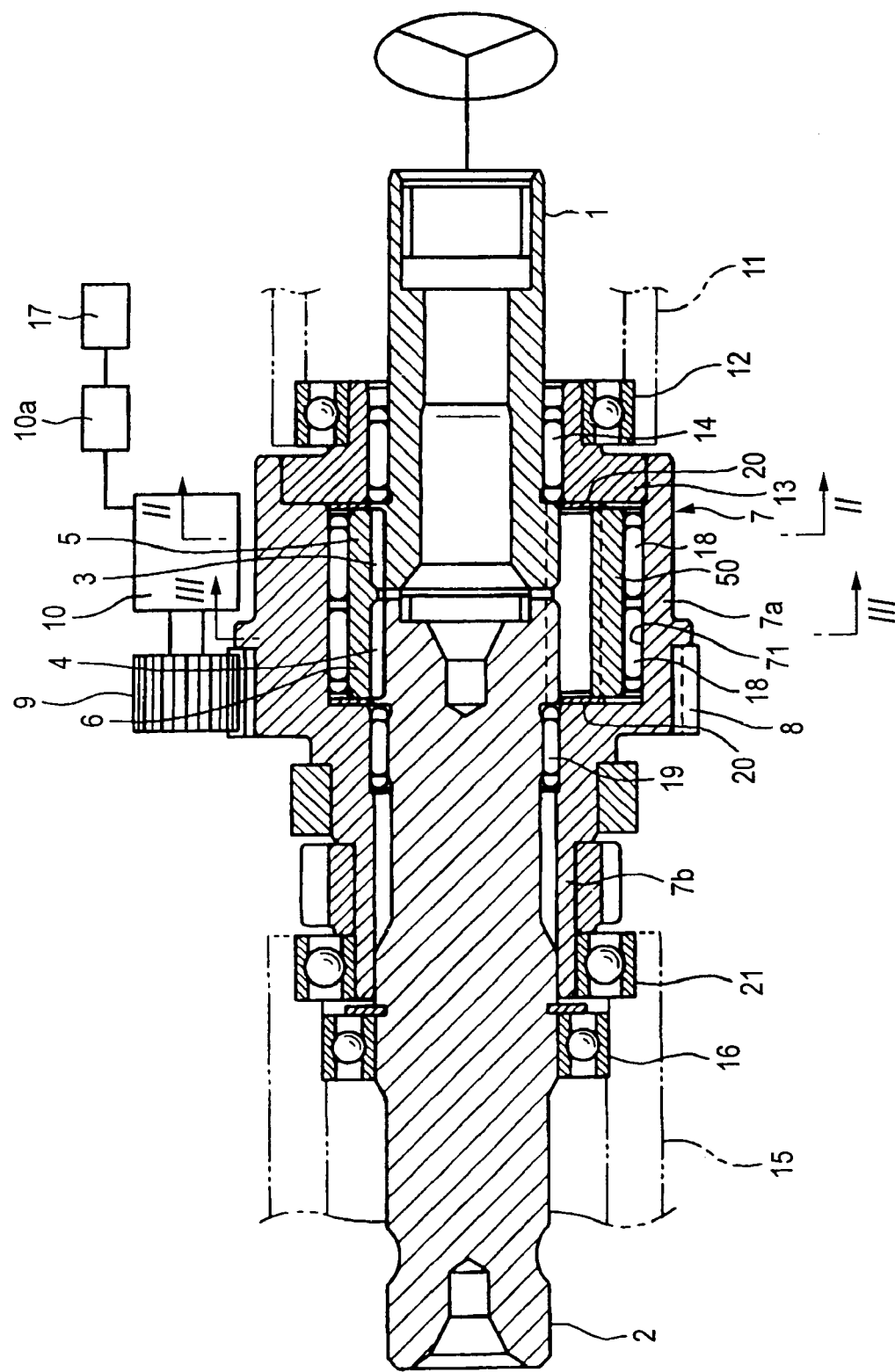
FIG. 1 is a sectional view showing a structure of a steering device for a vehicle according to the invention.
Figure 2:
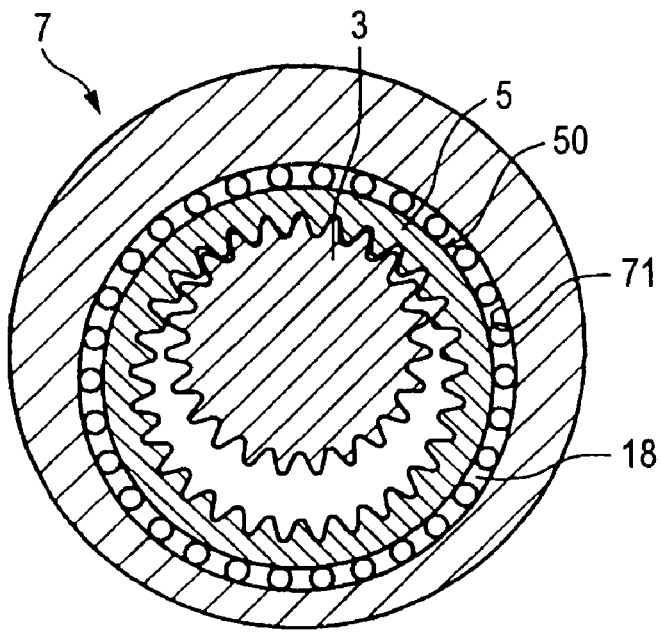
FIG. 2 is an enlarged sectional view taken along a line II-II in FIG. 1.
Figure 3:
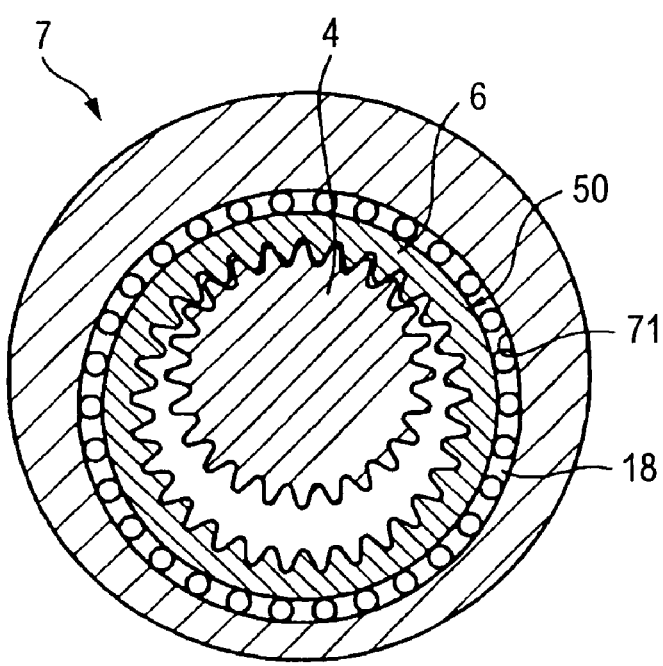
FIG. 3 is an enlarged sectional view taken along a line III-III in FIG. 1.

Now, the invention will be described in detail, referring to the drawings showing an embodiment of the invention. FIG. 1 is a sectional view showing a structure of a steering device for a vehicle according to the invention, FIG. 2 is an enlarged sectional view taken along a line II-II in FIG. 1, and FIG. 3 is an enlarged sectional view taken along a line III-III in FIG. 1.

This steering device for a vehicle includes a steering shaft 1 having a steering wheel (a steering member) coupled to an upper end thereof, a transmitting shaft 2 which is operated according to operation of the steering wheel and connected to a steering mechanism for turning vehicle wheels, a first sun gear 3 coupled to a lower end of the steering shaft 1, a second sun gear 4 coupled to an upper end of the transmitting shaft 2, a first planet gear 5 having internal teeth which are meshed with the first sun gear 3, a second planet gear 6 integrally formed with the first planet gear 5 and having internal teeth which are meshed with the second sun gear 4, a carrier 7 which supports the first and second planet gears 5, 6 so as to revolve and rotate on their own axes, an external teeth body 8 which is provided on an outer peripheral part of the carrier 7, and a driving gear 9 which is meshed with the teeth of the external teeth body 8. An electric motor 10 for differential motion is provided as an actuator for rotating the carrier 7.

The steering shaft 1 is rotatably held in a cylindrical part of a first support member 11 by means of a roller bearing 12, a rotating tube 13 which is rotatably held inside the roller bearing 12, and a needle roller bearing 14 which is fitted into the rotating tube 13. The transmitting shaft 2 is rotatably held in a cylindrical part of a second support member 15 by means of a roller bearing 16. The first and second sun gears 3, 4 are coaxially opposed to each other. Around the steering shaft 1, there are further provided a torque sensor (not shown) for detecting torque which is applied to the steering shaft 1, and a control part 17 for controlling a drive circuit 10a of the electric motor 10.

The first sun gear 3 is formed by cutting teeth on an outer peripheral part of the steering shaft 1, and the second sun gear 4 is formed by cutting teeth on an outer peripheral part of the transmitting shaft 2. The first and second sun gears 3, 4 are the same in diameter of an addendum circle. The first sun gear 3 is formed as a profile shifted gear in which a coefficient of addendum modification X is X>0, and the second sun gear 4 is formed as a non-profile shifted gear or a gear in which the coefficient of addendum modification X is X=0. In this manner, the number of the teeth of the first sun gear 3 is made smaller than that of the second sun gear 4, so that rotation transmitting ratio between the steering shaft 1 and the transmitting shaft 2 may be varied.

The internal teeth of the first and second planet gears 5, 6 are the same in diameter of an addendum circle, and formed by cutting teeth having a larger number than the number of the teeth of the first and second sun gears 3, 4, on an inner peripheral face of a cylindrical body 50 at opposite end parts thereof. The first and second sun gears 3, 4 are disposed in the cylindrical body 50. Because the cylindrical body 50 is arranged at a position eccentric with respect to the first and second sun gears 3, 4, the first planet gear 5 is meshed with the first sun gear 3, and the second planet gear 6 is meshed with the second sun gear 4.

The first planet gear 5 is the gear in which the coefficient of addendum modification X is X=0, and the second planet gear 6 is the gear in which the coefficient of addendum modification X is X=0, whereby the first and second planet gears 5, 6 have the same number of the teeth.

The carrier 7 has a fitting hole 71 which is eccentric with respect to the first and second sun gears 3, 4, and an outer peripheral face which is concentric with the first and second sun gears 3, 4. The carrier 7 includes a large diameter tubular part 7a having the fitting hole 71 in which the cylindrical body 50 is received and held, and a small diameter tubular part 7b which is continued from one end of the large diameter part 7a, and in which the transmitting shaft 2 at a side of the second sun gear 4 is received and held. The cylindrical body 50 is held in the large diameter tubular part 7a so as to rotate by means of two needle roller bearings 18, 18 which are juxtaposed, and the transmitting shaft 2 is held in the small diameter tubular part 7b so as to rotate by means of a needle roller bearing 19. Cover plates 20, 20 for closing the opposite ends of the cylindrical body 50 are provided at opposite ends of the fitting hole 71 thereby to prevent the lubricant to be applied to the teeth parts of the first and second sun gears 3, 4 and the first and second planet gears 5, 6 from being scattered to the exterior. Moreover, an open edge part of the large diameter tubular part 7a is rotatably supported by the first support member 11 by means of the rotating tube 13 and the roller bearing 12, and an end part of the small diameter part 7b is rotatably supported by the cylindrical part of the second support member 15 by means of a roller bearing 21. Further, the external teeth body 8 in an annular shape is fixed to an outer peripheral part of the large diameter part 7a at a side close to the small diameter part 7b by press-fitting.

The steering mechanism includes a pinion, a rack which is meshed with the pinion, and a rudder turning shaft which enables the vehicle to move in a lateral direction, and is constructed in such a manner that the vehicle wheels supported by the opposite ends of the rudder turning shaft can turn by operation of the steering wheel.

In the steering device for a vehicle having the above described structure, when the steering shaft 1 is driven to rotate by the steering wheel, the transmitting shaft 2 is rotated by way of the first sun gear 3, the first planet gear 5, the cylindrical body 50, the second planet gear 6, and the second sun gear 4. Moreover, when the electric motor 10 is actuated by a command signal which is outputted from the control part 17 to the drive circuit 10a, the carrier 7 is rotated by way of the driving gear 9 and the external teeth body 8, whereby speed of the transmitting shaft 2 is varied by way of the first and second planet gears 5, 6 of the cylindrical body 50, and the second sun gear 4. In this manner, the rotation transmitting ratio between the steering shaft 1 and the transmitting shaft 2 can be varied.

Because the first and second planet gears 5, 6 are formed on the cylindrical body 50, they can be integrally formed by cold forging, for example. Therefore, it is possible to reduce the number of components and the number of working steps, and hence, cost reduction can be achieved.

In the above described embodiment, the first sun gear 3 is formed as the profile shifted gear. However, the second sun gear 4 may be formed as the profile shifted gear, alternatively. It is also possible to form both of the first and second sun gears 3, 4 as the profile shifted gears.

Although the first and second sun gears 3, 4 and the first and second planet gears 5, 6 in the above described embodiment are spur gears, the first and second sun gears 3, 4 and the first and second planet gears 5, 6 may be helical gears, alternatively.

What is claimed is:

1. A steering device for a vehicle comprising:
a first sun gear connected to a steering member,
a second sun gear which is operated according to operation of said steering member and connected to a steering mechanism for turning vehicle wheels,
a first planet gear which is meshed with the first sun gear, and
a second planet gear which is rotated integrally with said first planet gear and meshed with said second sun gear,
wherein at least one of said first and second sun gears is a profile shifted gear, and said first and second planet gears are formed on a cylindrical body which has internal teeth of the same number at both end parts thereof.

2. A steering device for a vehicle as claimed in claim 1, wherein said first and second planet gears have a larger number of the teeth than that of the first and second sun gears, further comprising a carrier rotatably arranged concentrically with said first and second sun gears and having a fitting hole which is eccentric with respect to said first and second sun gears, said cylindrical body being rotatably held in said fitting hole.

3. A steering device for a vehicle, comprising:
a first sun gear connected to a steering member;
a second sun gear coaxial with said first sun gear and which is operated according to operation of said steering member and connected to a steering mechanism for turning vehicle wheels, wherein at least one of said first and second sun gears is a profile shifted gear;
a first planet gear which is meshed with the first sun gear;
a second planet gear which is rotated integrally with said first planet gear and meshed with said second sun gear, wherein said first and second planet gears are formed on the same cylindrical body and have the same number of teeth, which number is larger than that of the number of teeth of either of the first and second sun gears, and rotatably arranged around said first and second sun gears; and a rotatable carrier arranged concentrically with said first and second sun gears and having a fining hole which is eccentric with respect to said first and second sun gears, said cylindrical body being rotatably held in said fitting hole and provided eccentric with respect to said first and second sun gears.

4. The steering device according to claim 3, further comprising means for driving the carrier for rotation about the axis of the first and second sun gears.

* * * * *